April 30, 1963 J. H. GREENING ETAL 3,087,281
STACK HONING
Filed Feb. 23, 1960 11 Sheets-Sheet 6
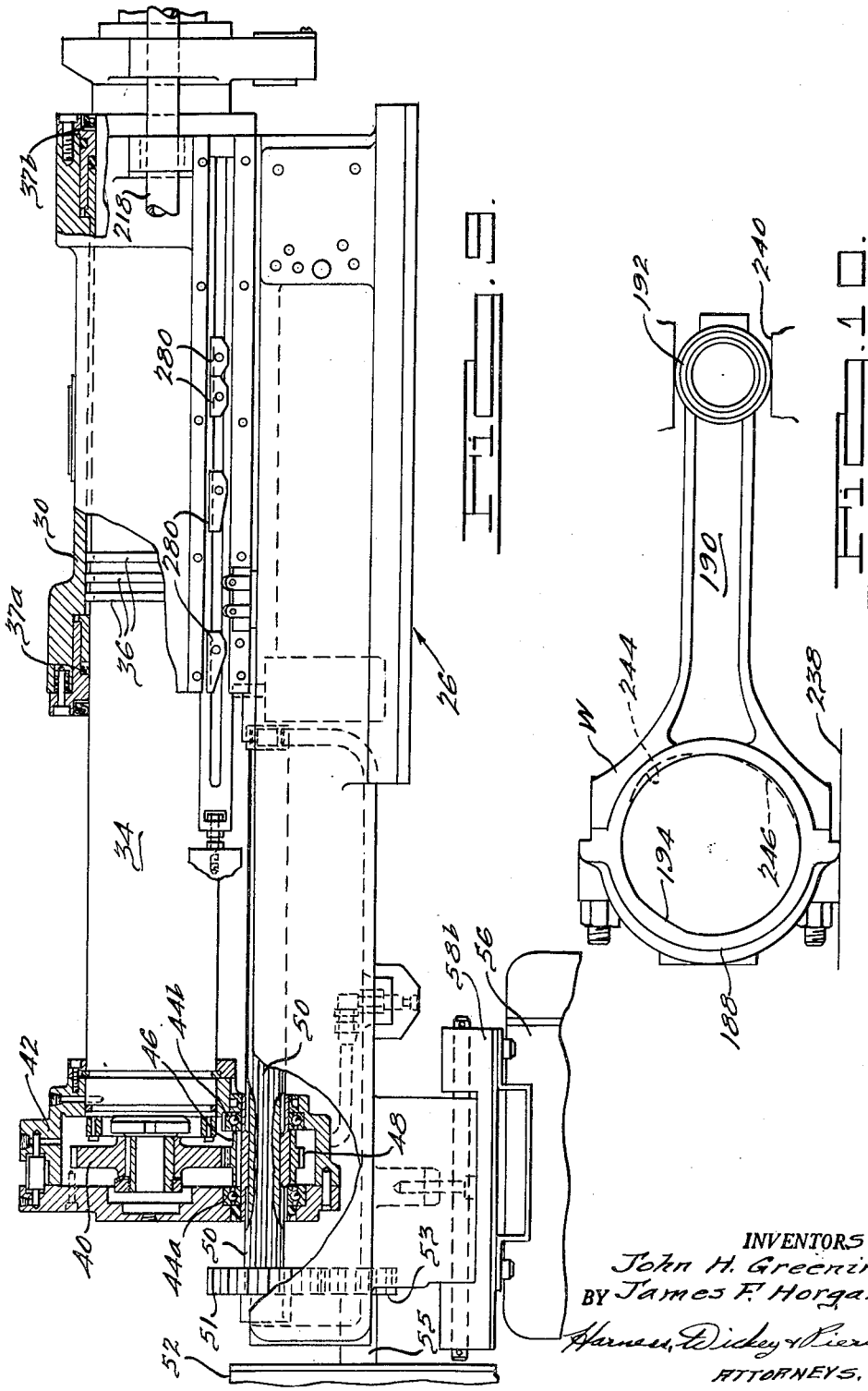
INVENTORS
John H. Greening,
BY James F. Horgan.
Harness, Dickey & Pierce
ATTORNEYS.

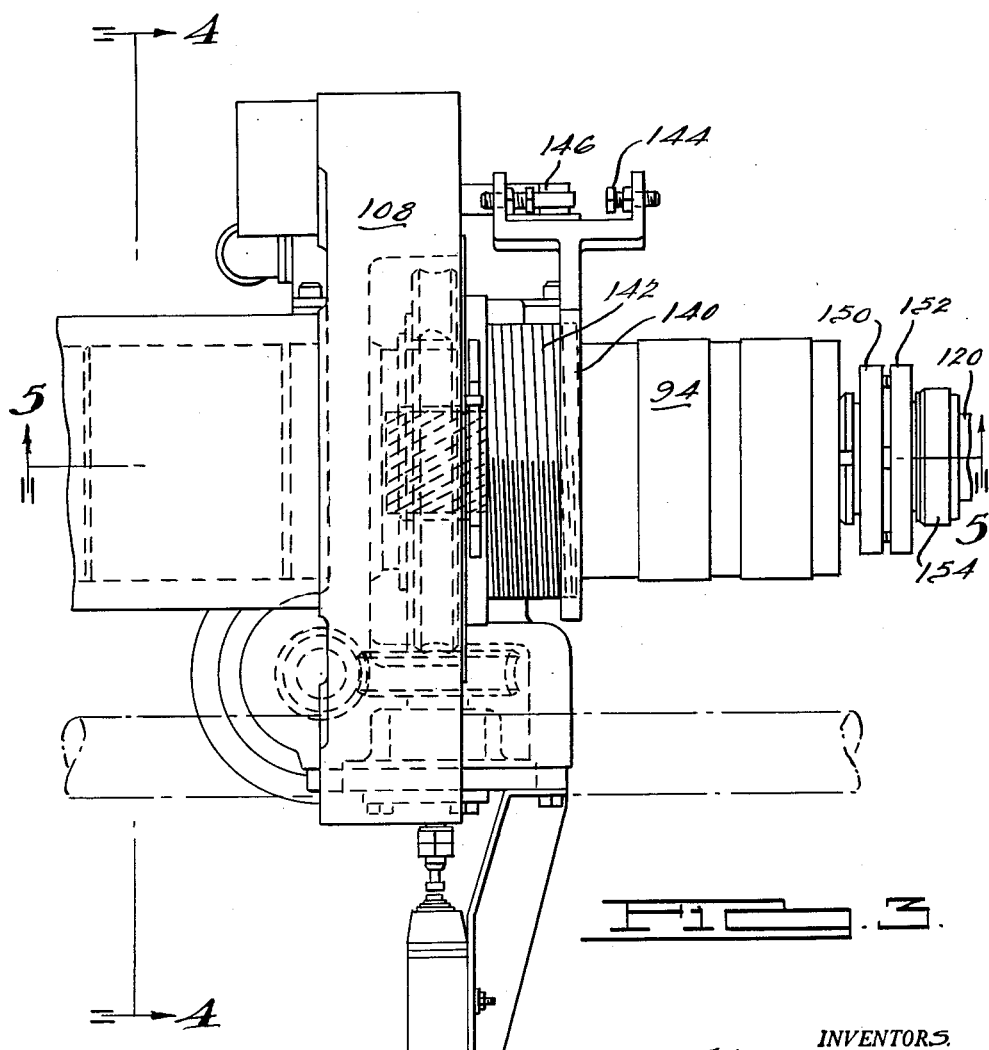

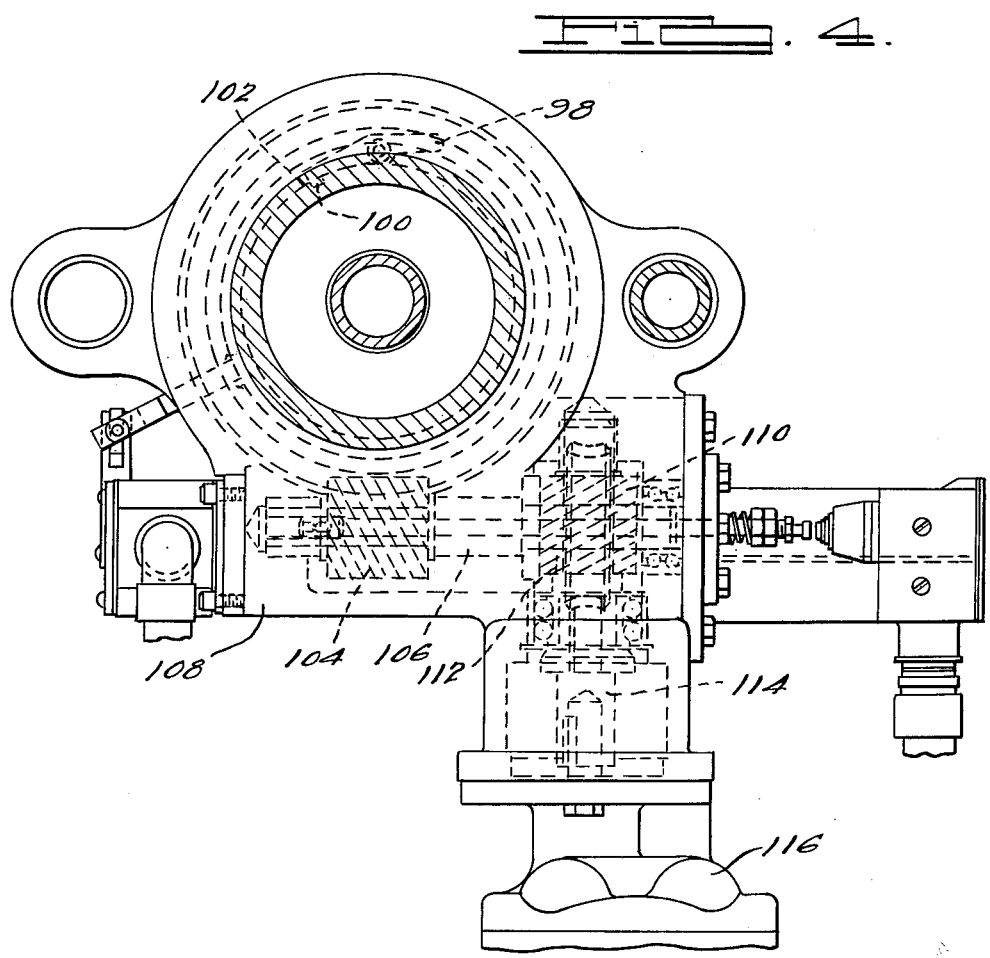

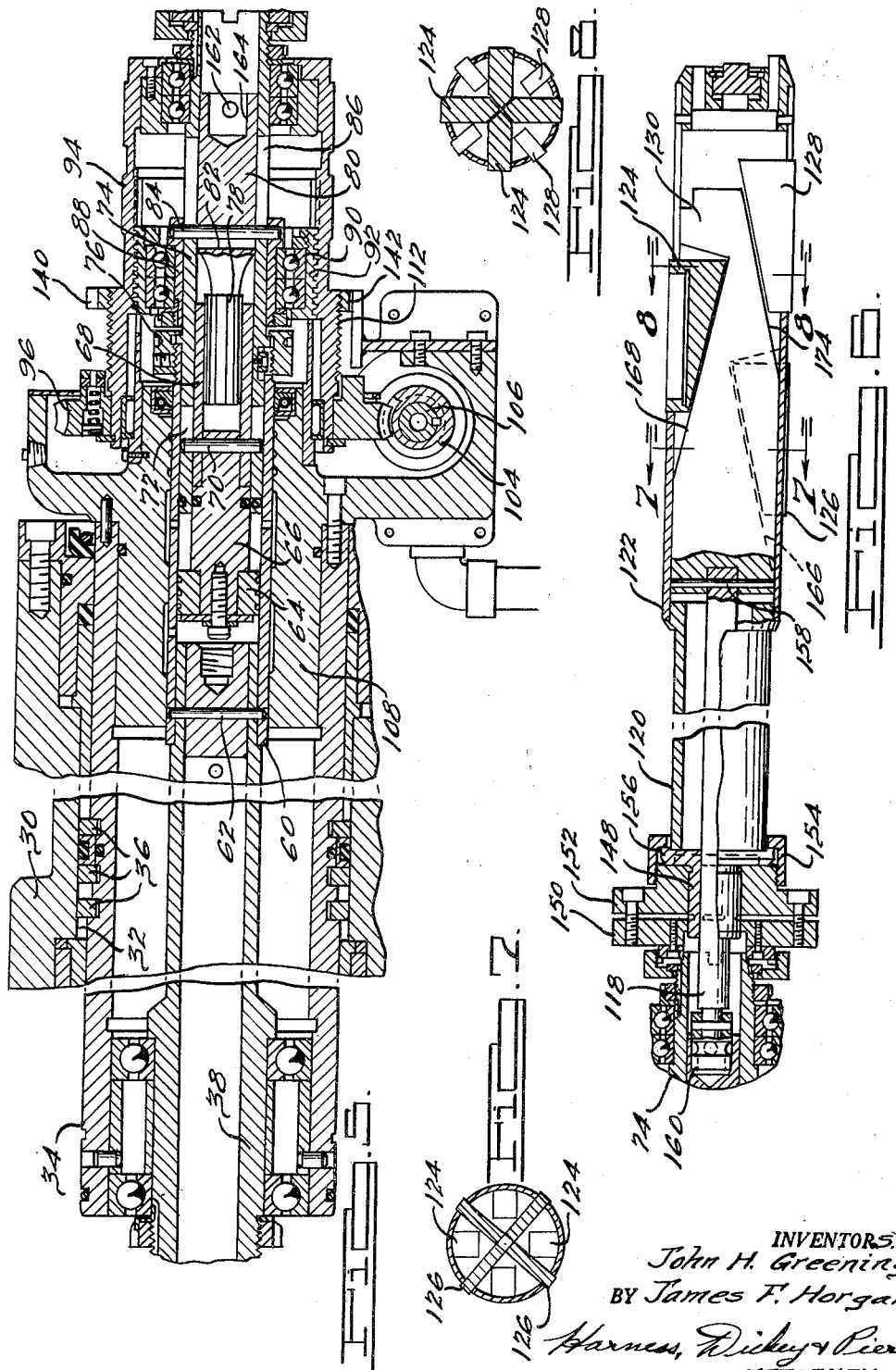

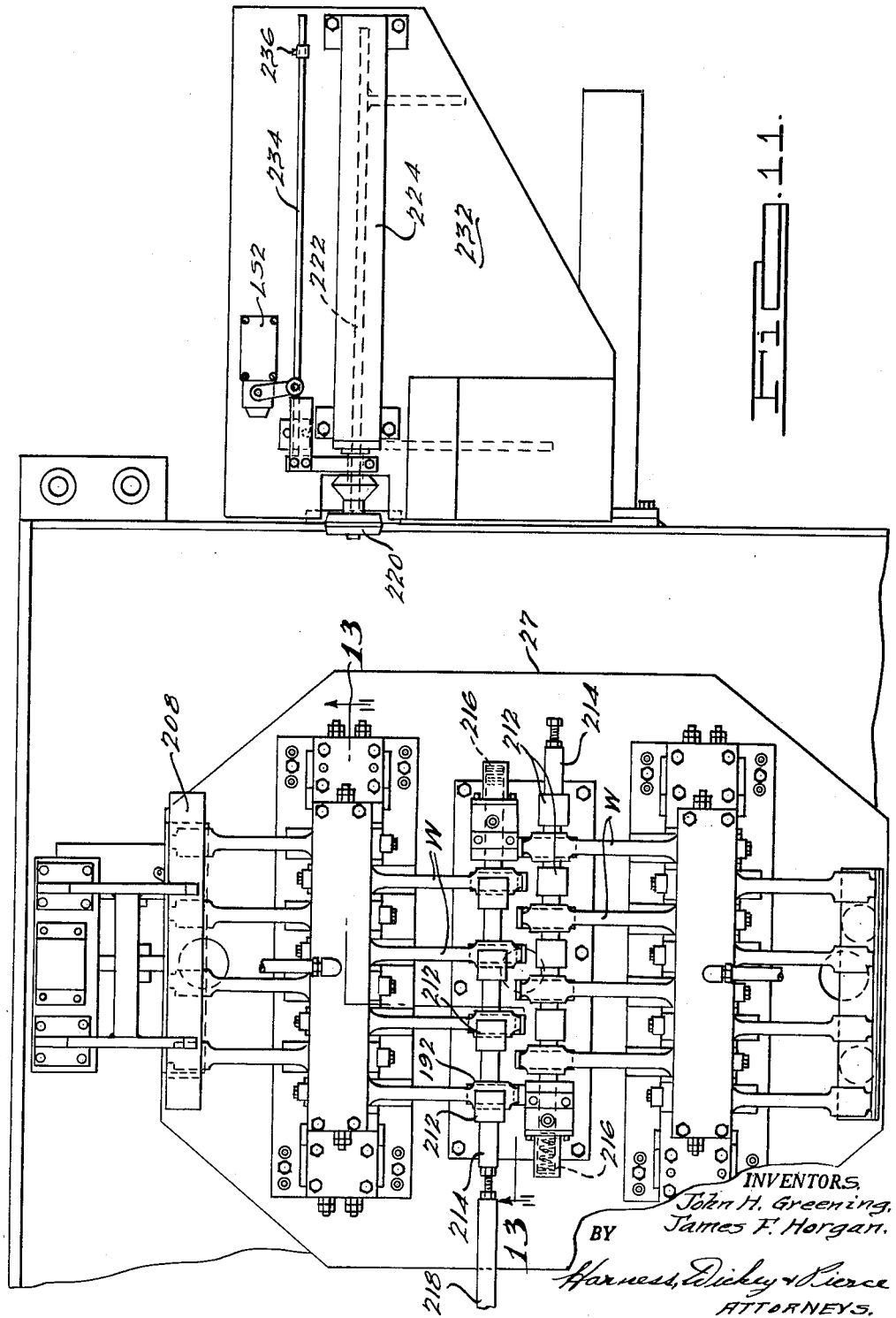

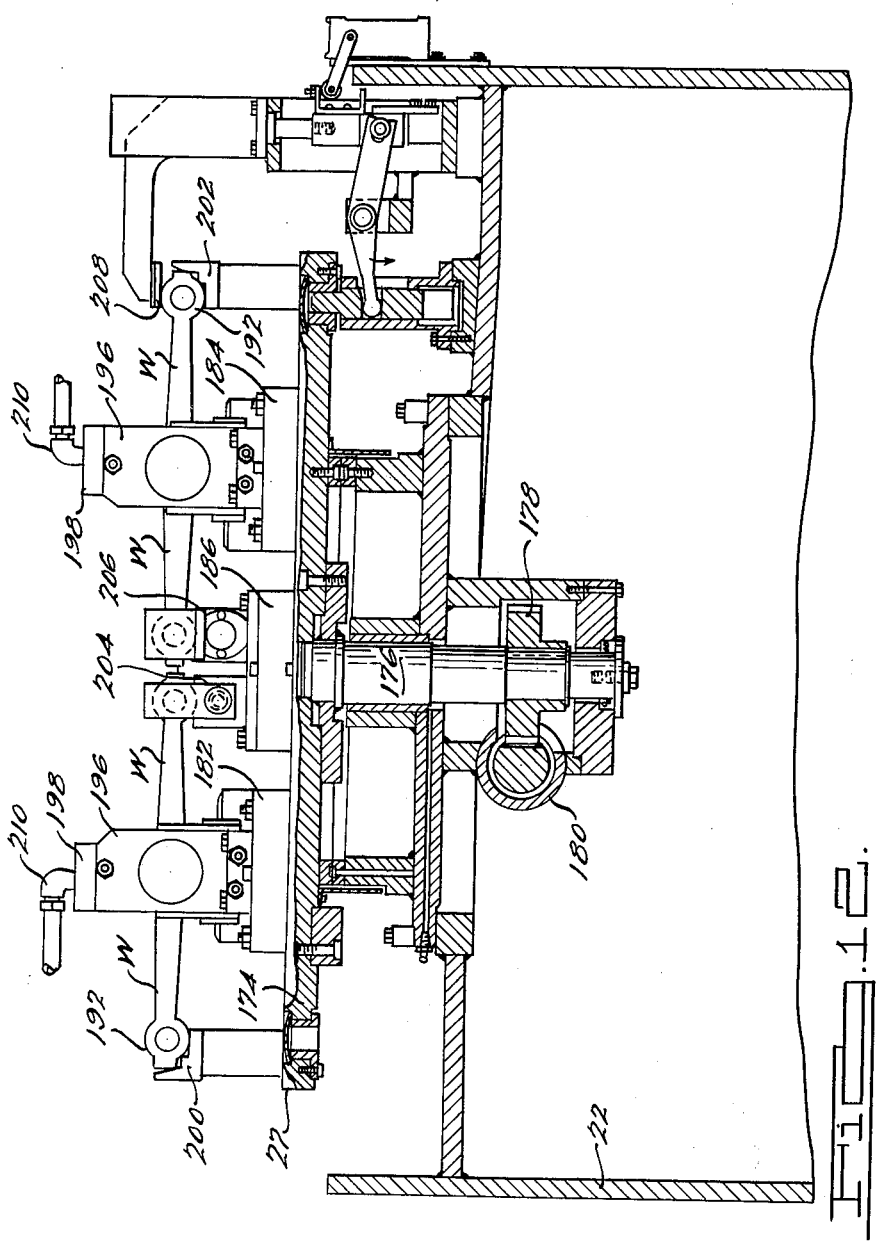

April 30, 1963  J. H. GREENING ETAL  3,087,281
STACK HONING
Filed Feb. 23, 1960  11 Sheets-Sheet 9
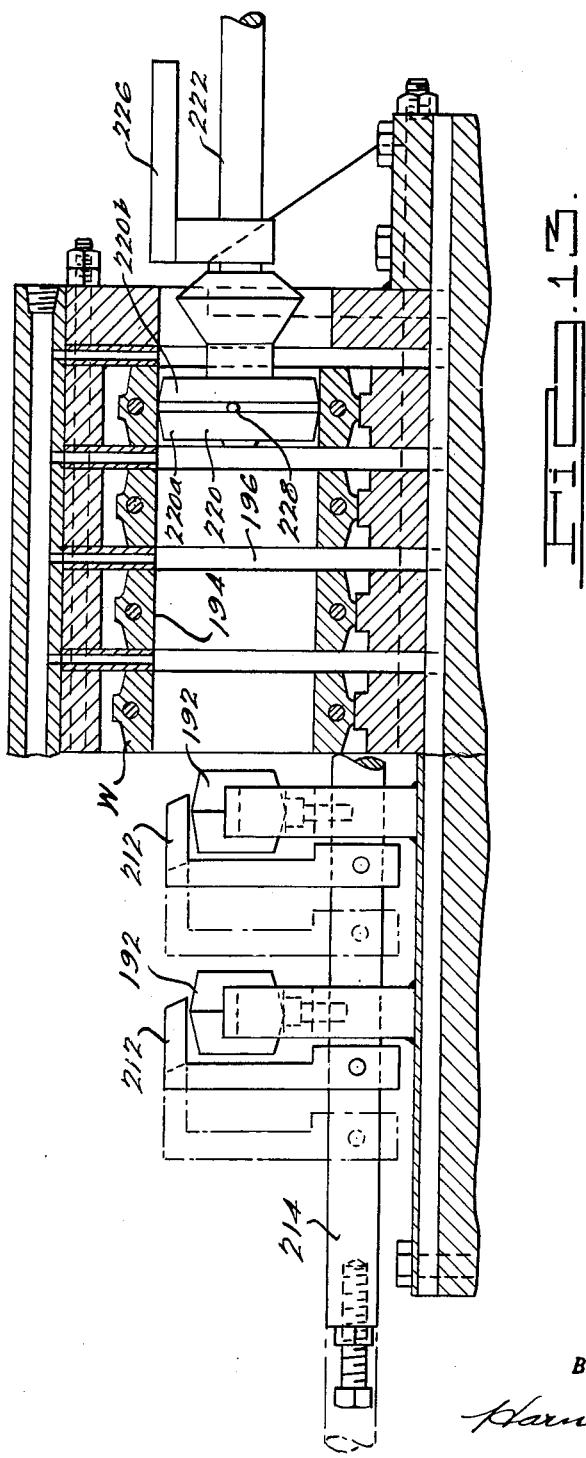
INVENTORS.
John H. Greening,
BY James F. Horgan.
Harness, Dickey & Pierce
ATTORNEYS.

April 30, 1963  J. H. GREENING ETAL  3,087,281
STACK HONING

Filed Feb. 23, 1960  11 Sheets-Sheet 10

INVENTORS.
John H. Greening,
BY James F. Horgan.

Harness, Dickey & Pierce
ATTORNEYS.

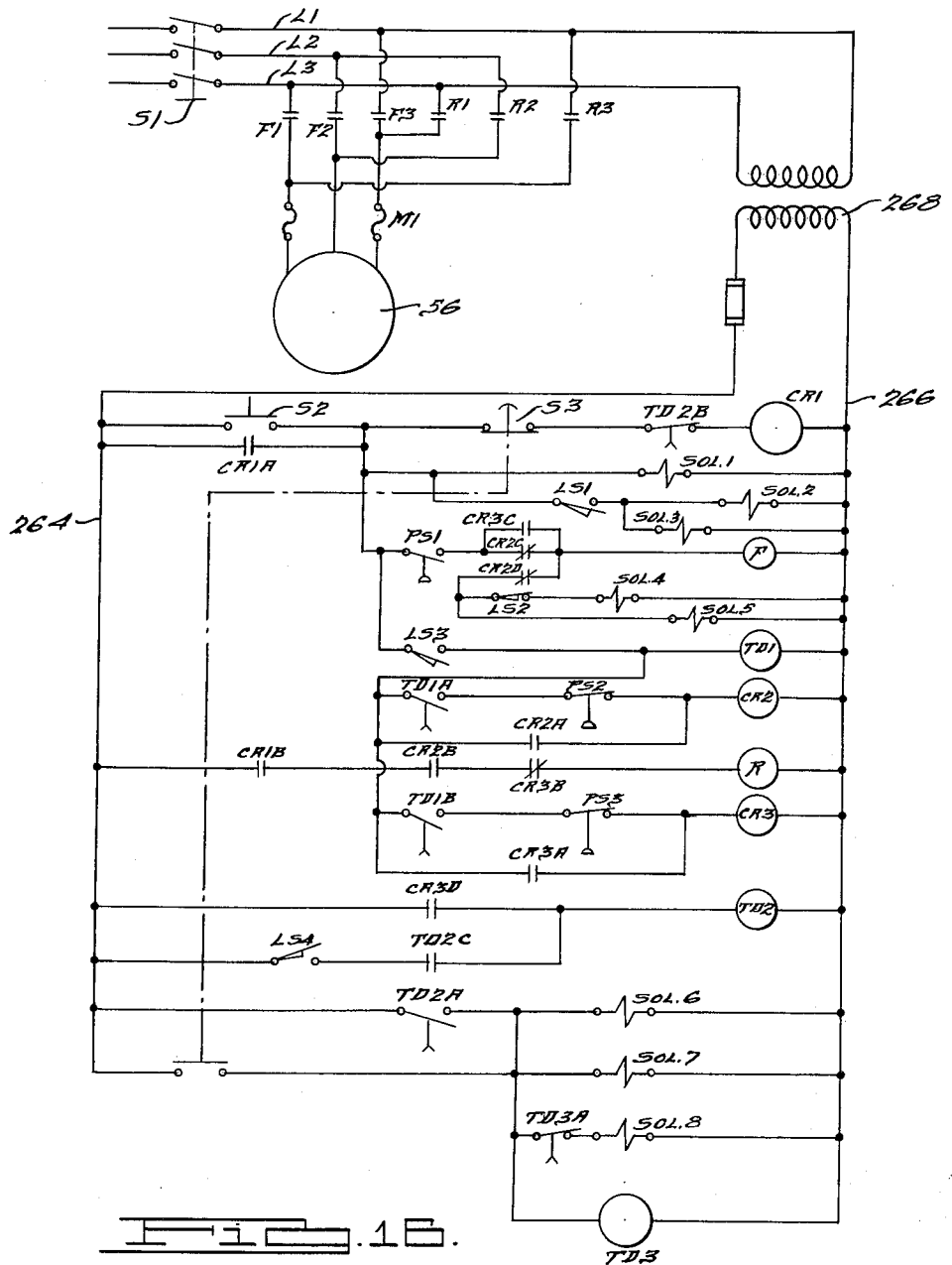

United States Patent Office 3,087,281
Patented Apr. 30, 1963

3,087,281
STACK HONING
John H. Greening, Birmingham, and James F. Horgan, Detroit, Mich., assignors to Micromatic Hone Corporation, Detroit, Mich., a corporation of Michigan
Filed Feb. 23, 1960, Ser. No. 10,196
7 Claims. (Cl. 51—34)

This invention relates to honing and, particularly, to a method and apparatus for simultaneously honing a plurality of workpieces with a single honing tool.

It is an object of the present invention to provide a method and apparatus for efficiently and accurately honing a large volume of workpieces on a honing machine having a single honing tool.

It is another object of the present invention to provide a method and apparatus for honing workpiece bores of a shallow depth as compared to the diameter thereof in an accurate and precise manner.

It is still another object of the present invention to provide an improved method and means for stack honing, that is, the honing of a plurality of workpieces having throughbores, with the bores disposed in alignment for the successive passage of the honing tool from one bore to another during the reciprocation of the tool.

It is still another object of the present invention to provide means for efficiently fixturing the workpieces for stack honing in a manner operable to improve the geometric accuracy of the bores produced.

It is still another object of the present invention to provide a method and apparatus for honing piston connecting rods or similar irregularly shaped parts to geometrically accurate shapes with straight, circular cylindrical bore walls and without producing "pockets" or other irregularities in the contour of the bore which have heretofore been encountered in the honing of such workpieces.

It is another object of the present invention to provide apparatus of the above character in which the honing stones of the tool are evenly and accurately guided from one bore to another in moving axially through the stack of workpieces.

It is still another object of the present invention to provide an apparatus and method of the above character in which torsional loading of the honing tool is evenly balanced by the arrangement of the workpieces.

It is a further object of the present invention to provide improved means for gauging the size of a workpiece being honed and for controlling the operation of a honing machine in response thereto.

Other objects and advantages of the invention will become apparent from the following detailed description taken in conjunction with the accompanying drawings wherein:

FIG. 3 is an enlarged plan view of a portion of the structure illustrated in FIG. 1, looking generally in the direction of the arrow A of FIG. 1;

FIG. 4 is a sectional view of the structure shown in FIG. 3, taken along the line 4—4 thereof;

FIG. 5 is a broken sectional view of structure partially illustrated in FIG. 3, taken along the line 5—5 thereof;

FIG. 6 is a broken longitudinal sectional view of the honing tool and supporting structure therefor illustrated in FIGS. 1 and 5;

Figure 1:
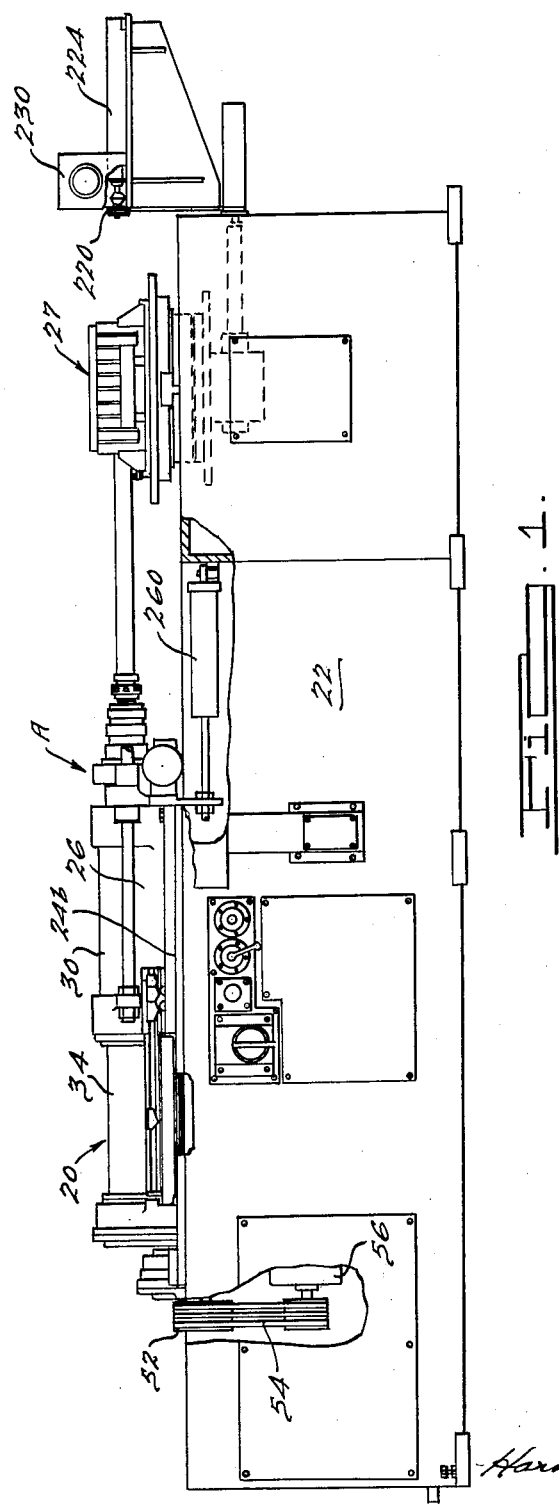
FIGURE 1 is a front elevational view with parts broken away of a honing machine and related apparatus embodying the principles of the present invention.
Figure 2:
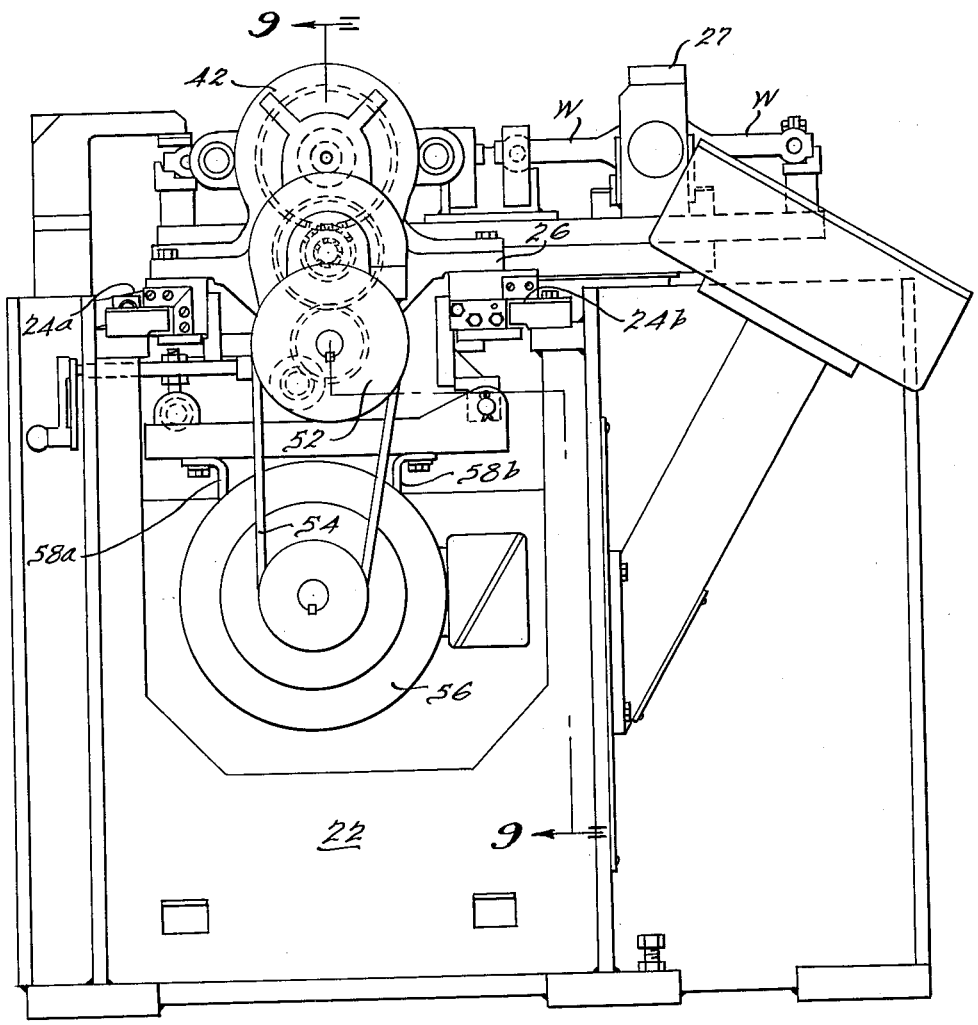
FIG. 2 is an enlarged end elevational view of the structure illustrated in FIG. 1.
Figure 14:
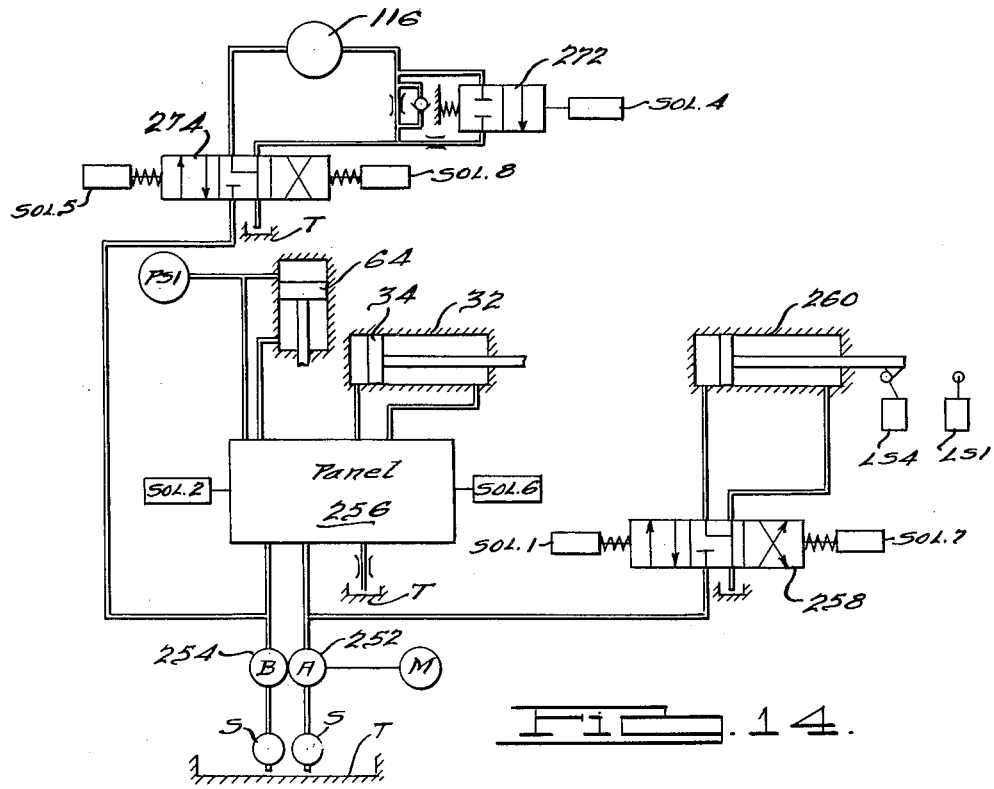
Figure 15:
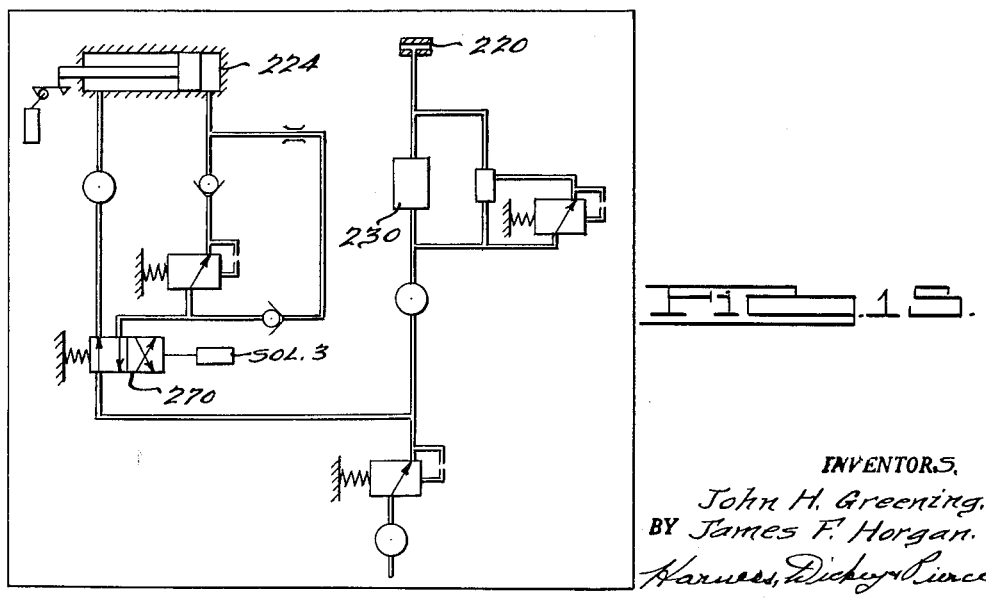

FIGS. 7 and 8 are sectional views of the structure illustrated in FIG. 6, taken along the lines 7—7 and 8—8 thereof, respectively;

FIG. 9 is an enlarged elevational view, with parts broken away, of the structure illustrated in FIG. 2, taken along the line 9—9 thereof;

FIG. 10 is a plan view of a connecting rod adapted to be honed by the apparatus of FIG. 1;

FIG. 11 is an enlarged plan view of the fixture and gauging structure illustrated in FIG. 1;

FIG. 12 is an end view, partly in vertical section, of the fixture illustrated in FIG. 11;

FIG. 13 is a sectional view of the structure illustrated in FIG. 11, taken along the line 13—13 thereof;

FIG. 14 is a diagrammatic view of a hydraulic circuit employed with the structure of FIGS. 1 to 10;

FIG. 15 is a diagrammatic view of the air circuit employed in the gauging device shown in FIGS. 1 and 11; and FIG. 16 is a view of a wiring diagram of the electrical circuit used to control the operation of the apparatus and unit illustrated in FIGS. 1 to 15.

Referring now to the drawings, FIG. 1 shows a honing machine generally designated by the number 20, which includes a large, cast metal base or frame 22 having a pair of horizontal ways 24a and 24b. A carriage 26 rests on the ways 24a and 24b for horizontal reciprocation toward and away from a fixture 27 also resting on the base 22. The carriage 26 is formed with a housing 30 which defines a cylindrical bore 32 surrounding a reciprocable quill 34. The quill 34 is exteriorly grooved to carry piston rings 36 which sealingly engage the cylindrical bore 32 and are adapted to receive the pressure of hydraulic fluid admitted between the quill 34 and bore 32 to effect reciprocation of the quill within the housing 30.

The housing 30 is provided with sealing means 37a and 37b at the opposite ends thereof which sealingly engage the quill 34 to prevent the escape of hydraulic fluid thereby.

The quill 34 is hollow and serves to rotatably support a drive spindle 38. The spindle 38 extends throughout the length of the quill and carries at its rear end a large spur gear 40 which is enclosed by a housing 42 mounted on the rear end of the quill. A pair of bearings 44a and 44b are mounted within the housing 42 to rotatably support a sleeve 46 having a small spur gear 48 formed thereon and disposed in meshing engagement with the large spur gear 40. The sleeve 46 is internally splined to interfit with an elongated splined shaft 50 mounted on the carriage 26 so as to freely rotate, but is held against axial movement. A spur gear 51 is mounted on the splined shaft 50 so as to be driven by a spur gear 53 which is rotated on a shaft 55 by a multi-groove pulley member 52 adapted to be driven through belts 54 by a spindle motor 56 suspended from the underside of the carriage by brackets 58a and 58b. Thus, rotary power may be supplied from the motor 56 through belt 54 and pulley 52, to shaft 55, gear 53 and 51 and then through gear 48 to gear 40 and thus to the drive spindle 38. It will be noted that the sleeve 46 can slide axially on the shaft 50 to permit reciprocation of the quill 34 on the carriage 26 without disturbing the transmission of power to the drive spindle.

Rotary power is supplied from the spindle 38 to a tubular coupling 60 by a torque pin 62. The coupling 60 also serves as a cylinder, within which a piston 64 reciprocates. The piston 64 is bolted to a rod 66 having a reduced diameter end portion disposed within a sleeve 68 and secured thereto for co-rotation by means of a pin 70. The opposite ends of the pin 70 extend radially outwardly of the sleeve 68 and are disposed within a pair of diametrically opposite slots 72 formed in a tubular drive member 74. The tubular coupling 60 is secured to the drive member 74 for coaxial movement by a lock nut 76. The sleeve 68 is interiorly splined to receive the splined end portion 78 of a push rod 80, the forward end of which is snugly but smoothly slidable in the drive member 74. The rod 80 is provided with a transverse bore 82 through which a pin 84 extends. The pin 84 extends through a pair of oppositely disposed slots 86 formed in the drive member 74 and the opposite ends thereof are fitted within an inner collar 88 surrounding the drive member 74. A pair of bearing members 90 engage the outer diameter of the collar 88 and rotatably support the same within an outer collar 92. The outer collar 92 is exteriorly threaded to threadably engage with threads formed on the inner wall of an adjusting sleeve 94. The adjusting sleeve 94 serves to rotatably support a large worm wheel 96 which may be keyed or locked to the adjusting sleeve 94 by manual operation of a locking pawl or clutch 98, so as to seat a finger 100 thereon within a shouldered groove 102 formed on the outer diameter of the adjusting sleeve 94. The worm wheel 96 is adapted to be rotated by means of a worm gear 104 disposed on the end of a drive shaft 106 journaled within a head or housing 108 mounted on the forward end of the quill 34. A worm wheel 110 is also mounted on the shaft 106 and is adapted to be driven by a worm gear 112 mounted on a vertical shaft 114. The shaft 114 is keyed to the drive shaft of a fluid motor 116, so as to be driven thereby. The fluid motor 116 is of the usual type and contains a rotor (not shown) adapted to be rotated upon the passage of hydraulic fluid through the motor 116. Thus, rotation of the drive shaft of the motor 116 is operable to rotate the shaft 114 and the gear 112 thereon. The gear 112 being in mesh with the gear 110 effects rotation of the shaft 116 to rotate the worm 104. Rotation of the worm 104 produces rotation of the worm gear 96 and, when the clutch member 98 is in driving position, the adjusting sleeve 94 will thus be rotated. Rotation of the adjusting sleeve 94 will produce axial movement of the outer collar 92, which is held against rotation relative to the housing 108. The outer collar thus will advance axially in a right-hand direction as viewed in FIG. 5 and will carry the inner sleeve 88 with it. The sleeve 88 which carries the pin 84 thus advances the push rod 80 in an axial direction to axially move an expansion rod 118 carried within the hollow drive shaft 120 of a honing tool 122. This operation is effective to expand the honing stones 124, 126 and 128 of the honing tool by axial movement of a cam expansion member 130 carried within the honing tool. The honing tool and its construction will be subsequently explained in greater detail.

It will thus be seen that the rotation of the fluid motor 116 provides one means for expanding the stones of the honing tool. Additional, extremely rapid advancement of the honing stones may be accomplished by admitting fluid to the interior of the tubular coupling 60 to react against the piston 64. The movement of the piston 64 is transmitted through the pin 70 to the walls of the slot 72 which are disposed on a helix so as to produce rotation of the drive member 74 of the pin 84. The wall of the bore 82 is helically inclined and serves as a cam to move the member 80 forward a short distance upon the rotation of the collar 88. A ring 140, which is internally threaded, is mounted on an exteriorly threaded portion 142 of the adjusting sleeve 94. The ring 140, which is held against rotation but which may be moved axially, carries an abutment 144 adapted to actuate a switch 146 to indicate the approximate time at which the honing stones 124, 126 and 128 will have been used up. However, this particular feature forms no part of the present invention.

The honing tool drive shaft 120 is provided with a reduced diameter pilot portion 148 adapted to seat within the bores of a pair of flange members 150 and 152 carried on the end of the drive member 74 and held by means of a collar 154 retained on the drive shaft 120 by a shouldered portion 156 and threaded onto the flange member 152. The stone expansion rod 118 is pinned to the expansion member 130 at 158 and carries at its extremity a grooved member 160 adapted to receive ball detents 162 carried within a blind bore 164 formed in the end of the member 80. Thus, axial movement of the member 80 will be transmitted through the rod 118 to the cam expansion member 130.

As may be seen in FIGS. 6, 7 and 8, the cam expansion member 130 of the boring tool is provided with circumferentially arranged sets of cam surfaces 166, 168, and 170 adapted to bear against the seats of honing stones 126, 124 and 128, respectively, whereby said honing stones will be expanded in a radial direction upon axial movement of the expansion member 130 in a right-hand direction, as viewed in FIG. 6.

FIGS. 11, 12 and 13 illustrate a fixture 27 adapted to be used in the practice of the present invention and which is intended to support a plurality of workpieces W, which are illustrated herein as being connecting rods. The fixture 27 includes a bed 174 supported for rotation on a vertical shaft 176. The shaft carries a worm gear 178 at its lower end whereby the shaft 176 may be rotated by rotation of a worm 180. The bed 174 has a supporting block 182 on one side thereof and a supporting block 184 on the opposite side thereof and a central supporting block 186 in the center thereof. As may be seen in FIG. 10, the workpiece includes a thin-walled portion 188 which is integrally formed with a rod portion 190 having a small bore defining a portion 192 at its opposite end. The thin walled portion 188 defines a bore 194 which is the bore to be honed. The large thin walled portions 188 are supported on the blocks 182 and 184 with the rod portions 190 being disposed in alternately oppositely extending directions. The portions 188 are disposed in alignment and are generally supported by a plurality of parallel, spaced vertical thrust plates 196 engageable with the sides or faces of the workpiece portions 188. Disposed above the portions 188 are torque plates 198 adapted to receive the force tending to rotate the workpieces when the honing tool is rotated in a given direction. The small ends 192 rest on abutment members 200 and 202 disposed on the outer sides of the blocks 182 and 184, respectively, and the abutment members 204 and 206 are disposed on the block 186. It will be seen that when one stack of workpieces disposed on one of the blocks 182 or 184 is being honed, the other block will be available for unloading and loading of workpieces. In addition, the small ends 192 disposed outwardly of the fixture of the stack being honed will be positioned beneath a stationary torque plate 208 to receive the total load attempting to rotate the small ends in an upward direction when the honing stone is rotated in a given direction. Each of the plates 198 is provided with a suitable coupling 210 through which coolant may be admitted for cooling the workpieces. The small ends 192 of the workpieces disposed inwardly of the stack being honed will abut upon attempted upward movement against shouldered members 212 carried by a rod 214. The shouldered members 212 are normally held out of vertical alignment with the small ends 192 of the workpieces by means of springs 216 to permit loading and unloading of the fixture. However, the rod 214 of the stack in honing position will be abutted by a rod 218 carried by the carriage 26 when the carriage 26 is moved into honing position.

Disposed in axial alignment with the portion of the workpieces in a honing position is a generally disk-shaped air gauge 220 carried on a shaft 222 and reciprocable in and out of the bores 194 of the workpiece W under the influence of an air cylinder 224. The periphery of the air gauge is provided with bevelled flange portions 220a and 220b which aid in facilitating the movement of the air gauge in and out of the portion of the workpiece. A bracket 226 serves in supporting and guiding the shaft 222. Disposed on the periphery of the air gauge 220 are a pair of diametrically opposed nozzle orifices 228 from which air is emitted against the wall of the bore within which the gauge is located. The air emitted from the gauge 220 is passed through an air gauging control unit 230. The unit 230 is a Moore Model 88D automation control, manufactured by the Moor Products Company, of Philadelphia, Pennsylvania, as a standard commercial product available on the open market. The unit 230 contains certain pressure responsive switches adapted to sense the back-pressure created by the proximity of the bores 194 to the orifices 220 and they may be set to trip at varying pressures to sense predetermined diameters of the bore within which the gauge is located. The air cylinder 224 is mounted on a platform 232 carried at one end of the frame 22. A rod 234 is carried by the gauge rod 222 and is provided with a finger 236 at one end thereof adapted to actuate a limit switch LS3 when the gauge 220 is in position within the bore.

FIG. 10 illustrates the pockets or irregularities which have been formed in a workpiece such as at the connecting rod W in previous attempts to hone such workpieces. If the tool in the connecting rod is rotated in one direction and the workpiece is supported on the surfaces 238 and 240, an outwardly bulging pocket will be formed at 244 and an inwardly disposed, irregularly flat portion of the bore will be formed at 246. This results from the fact that the long length of material formed by the long rod portion 190 extending between the bearing supports acts as a lever to cause the material at the juncture between the thin walled portion 188 and the rod portion 190 to bow out at location 246. When this torsional loading or leverage is released and the metal surrounding the bore 194 is permitted to return to its normal relaxed position, the pocket 244 and irregularly flat portion 246 are thus formed. In practice, it has been found that the pockets or irregularities have frequently resulted in a total out-of-round condition amounting to approximately five ten-thousandths of an inch. It is within the scope of the present invention to substantially reduce this out-of-roundness, and it has been found that the total out-of-roundness may be held within one ten-thousandth of an inch by the practice of the present invention. For this purpose, the apparatus and method of the present invention envisions the utilization of the air gauge 220 to sense when the bores of the workpieces have been honed to a first predetermined diameter, which is slightly less than the final diameter to which it is desired to hone the bores. In practice, this difference has been set at between five ten-thousandths of an inch and one-thousandth of an inch, satisfactory results being obtained. The sensing of the first predetermined dimension is preferably utilized to reverse the direction of rotation of the spindle, which compresses the material surrounding the bore 194 in an opposite direction and a final limited honing operation with a reversed rotation will substantially eliminate the pocket and irregularities 244 and 246. Alternatively, it has been found that by limiting the outward feeding of the honing stones in response to the sensing of the first predetermined diameter and honing the final distance under very limited feeding pressure, that the out-of-roundness may be substantially reduced. In addition to elimination of pocketing, the alternating arrangement of the rods in the fixture of the present invention eliminates a torsional winding up of the honing tool which has been found to produce irregularities in certain connecting rods.

A schematic representative of the hydraulic circuit for controlling the operation of the honing machine is illustrated in FIG. 14 in which hydraulic fluid is drawn from a tank T, through strainers S and pumped by means of a pair of variable delivery hydraulic pumps 252 and 254. The hydraulic fluid is first pumped through a hydraulic control panel 256. From the panel 256 the fluid may flow to either side of the piston rings carried by the quill 34 to reciprocate the quill 34 within the cylindrical bore 32. The pumps 252 and 254 are both shown as being driven by an electric motor M. The hydraulic fluid is additionally free to flow from pump 252 through valve 258, to reciprocate the piston of a cylinder 260 connected to the carriage 26 for the purpose of reciprocating the carriage in either of two opposite directions. The carriage is operable to actuate a limit switch LS4 in its rearward position and a limit switch LS1 when it rests in its forward position. When the quill moves forward to begin its first reciprocation cycle, the piston of a cylinder 262 will be actuated to energize a pressure responsive switch PS1.

Referring additionally to FIG. 16, the complete sequence of operation of the machine may be followed. Power is supplied through switch S1 to lines L1, L2 and L3. The motor 56, which is a reversible motor, may be from L1, L2 and L3 through either contacts F1, F2 and F3 to be driven in one direction or through contacts R1, R2 and R3 to be driven in the opposite direction. It will be apparent that the contacts are operable to reverse the leads through which the motor is energized and, as is well known, thereby reverse the direction of rotation of the motor. Power is supplied from lines L1, L2 and L3 to main conductors 264 and 266 through a step-down transformer 268. A starting switch S2 is connected between the conductors for purposes of starting the operation of the machine and the momentary closure of switch S2 will energize relay CR1 through normally closed contacts CR1a, which are operable to complete a holding circuit therefor.

A stop switch S3 is provided to interrupt the circuit to relay CR1a and thereby permit manual termination of the entire honing cycle prior to the normal termination thereof. The closure of contacts CR1a also serves to energize solenoid 1, which actuates valve 258 to admit fluid to the cylinder 260 in order to advance the carriage 26. When the carriage reaches the end of its travel, limit switch LS1 will be actuated to close its normally open contacts and thereby energize solenoid 2. Solenoid 2 is effective to admit fluid to cylindrical bore 32 to initiate reciprocation of the quill 34 in the housing 30. Simultaneously, solenoid 3 will be energized through contacts CR1a and LS1 to actuate valve 270, which admits air to the air cylinder 224, thus causing the air gauge 220 to be advanced into the aligned bores 194 of the workpieces W. Upon the first reciprocation of the quill 34, the pressure switch PS1 in the hydraulic control panel will be actuated to effect the closure of its normally open contacts to thereby energize forward motor starter relay F through normally closed contacts CR2c. Energization of the relay F causes closure of contacts F1, F2 and F3 to produce forward rotation of the spindle drive motor 56. Closure of switch PS1 will also energize solenoid 4 through a circuit including normally closed contatcs CR2c, CR2d and LS2, which is normally closed until the honing stones engage the wall of the bores to be honed. The closure of PS1 also energizes solenoid 5. The energization of solenoid 4 energizes a valve 272 and the energization of solenoid 5 actuates a valve 274 to complete a hydraulic circuit through said valves and through the fluid motor 116 to drive said motor and, thus, effect expansion of the honing stones beyond that to which they are expanded by piston 64. When the gauging plug enters the bore, the limit switch LS3 will be closed to energize time delay relay TD1. After a momentary lapse, the contacts TD1a will close, attempting to complete a circuit through the contacts of pressure responsive switch PS2 included within the Moore control unit 230. During the preliminary strokes of the honing tool, it is entirely possible that the bore will not be of a sufficient size to permit the entry of the gauge 220 therein, in which case the limit LS3 will still be open. However, if the gauge 220 has entered the bore and the bore is undersize, back-pressure within the gauge unit 230 will be such as to cause the pressure responsive switch PS2 to open, thereby preventing the energization of relay CR2. The delay in the closure of contacts TD1a assures sufficient time for a build up of pressure in the unit. The switch PS2 is set to close at a bore diameter slightly less than that of the final size. As has been mentioned previously, this first predetermined delay may be of varying amounts. In one working embodiment of the present invention, however, it has been variously set to close at between five ten-thousandths and one-thousandth of an inch less than the diameter of the final size desired. The energization of relay CR2 will cause closure of its contacts CR2a to establish a holding circuit for CR2 to maintain CR2 energized. At the same time, contacts CR2b will close to establish a circuit through now closed contacts CR1b and normally closed contacts CR3b to energize the reverse motor starter relay R. At the same time, normally closed contacts CR2c will open to deenergize forward motor relay F. Thus, the spindle motor 56 is now energized through contacts R1, R2 and R3 to cause rotation of the motor 56 in a reverse direction. Upon attainment of the final desired size, pressure switch PS3 included in the Moore unit 230 will remain closed after the gauge has entered the bores to be honed and after a time delay contacts TD1b will close to establish a circuit through switch PS3 and energize control relay CR3 and contacts CR3a will close to establish a holding circuit to maintain relay CR3 energized. At the same time, contacts CR3d simultaneously close to energize time delay relay TD2, contacts TD2c immediately close. After a time delay, contacts TD2a will close to energize solenoid 6 which, in turn, admits fluid to the cylindrical bore 32 in a direction causing complete retraction of the quill 34 in the housing 30. The solenoid 7 is likewise actuated by the closure of contacts TD2a to shift the spool of valve 258 and to direct hydraulic fluid to the cylinder 260 in a direction operable to fully retract the carriage 26. Solenoid 8, which has simultaneously been actuated, is operable to shift the spool of valve 274 in a direction reversing the flow of fluid through motor 116 and collapsing the tool. After a predetermined length of time, contacts TD3a will open to terminate the collapse of the tool. Closure of contacts TD3a also serve to energize time delay relay TD3 which will close its contacts TD3a and terminate collapse of the tool by the de-energization of solenoid 8.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. The method of honing the bore of a workpiece which includes rotating a honing tool in said bore in a given direction, reciprocating the honing tool in said bore, intermittently introducing gauge means into said bore to sense the enlargement to a first predetermined size and to a second larger predetermined size, reversing the direction of rotation of the honing tool upon the enlargement of said bore to said first predetermined size as determined by said gauge means and terminating the honing operation upon the enlargement of the bore to said second predetermined size as determined by said gauge means.

2. The method of honing the bore of a workpiece which includes rotation of a honing tool in said bore in a given direction, reciprocating the honing tool in said bore, intermittently introducing gauge means into said bore to sense the enlargement of said bore to a first predetermined size and to a second larger predetermined size, reversing the direction of rotation of said tool upon the attainment of said first predetermined size, as determined by said gauge means and reversing the direction of rotation of said honing tool back to said given direction upon the attainment of said first predetermined size as determined by said gauge means.

3. A honing device including a honing tool, means for supporting a workpiece having a through bore to be honed, means for reciprocating said honing tool through said bore, motor means for rotating said tool in either of two opposite directions, gauge means operable to enter said bore to sense the enlargement of said bore to a first predetermined size and to a second larger predetermined size, switch means actuated by said gauge means for reversing the direction of said motor means upon the sensing of the enlargement of the bore to said first predetermined size by said gauge means and a second switch means for initiating termination of the honing operation actuated by said gauge means upon sensing of the enlargement of the bore to said second predetermined size by said gauge means.

4. A honing device including a honing tool, means for supporting a workpiece having a through bore to be honed, means for reciprocating said honing tool through said bore, motor means for rotating said tool in either of two opposite directions, air gauge means operable to enter said bore and emit air toward the wall of said bore, a first pressure responsive switch means responsive to the pressure of the air emitting from said gauge means for sensing the enlargement of said bore to a first predetermined size, a means actuated by said first switch means for reversing the direction of rotation of said honing tool, a second pressure responsive switch means responsive to the pressure of air emitting from said air gauge operable to sense the enlargement of the bore to a second larger predetermined size and means controlled by said second switch means for initiating termination of the honing operation.

5. A honing device including a honing tool having expansible honing stones, means for supporting a workpiece having a bore to be honed, means for reciprocating said honing tool in said bore, expansible means for controlling the expansion of said honing stones, gauge means operable to enter said bore to sense the enlargement of said bore to a first predetermined size and to a second predetermined size, switch means actuated by said gauge means for controlling the operation of said expansible means in response to the sensing of the enlargement of said bore to said first predetermined size by said gauge means and means for initiating termination of the honing operation in response to the sensing of the bore to said second predetermined size by said gauge means.

6. A honing device including a honing tool, means rigidly supporting said honing tool for rotation about and reciprocation along a fixed axis, and a fixture for supporting a plurality of workpieces having through bores to be honed with the bores of the workpieces disposed substantially in alignment, said fixture having a plurality of fixed parallel thrust plates interposed between the workpieces and engageable with the opposite sides of the workpieces for absorbing the thrust loads generated by reciprocation of the honing tool, said thrust plates being arranged perpendicularly to the axis of said honing tool and being spaced apart to permit shifting movement of the workpieces parallel to the planes of said thrust plates whereby the positions of the bores of the workpieces will be established by said tool.

7. Apparatus for honing a plurality of workpieces, each of which has a thin-walled portion defining a bore to be honed and a rod-like portion extending from one side of said thin-walled portion, said apparatus including a honing tool, means supporting said honing tool for reciprocation along and rotation about a given axis, and a fixture for supporting a plurality of workpieces with the bores to be honed disposed substantially in alignment and with the rod-like portions thereof disposed in alternately oppositely extending arrangement, said fixture having means disposed on opposite sides of said given axis engageable with the rod-like portions of said workpieces operable to prevent rotation of the workpieces, the alternate arrangement of said workpieces being operable to substantially balance the forces on said tool reactive to the forces applied to said workpieces by said last-named means.

(References on following page)

References Cited in the file of this patent

UNITED STATES PATENTS

| | | |
|---|---|---|
| 1,810,214 | Johnson | June 16, 1931 |
| 1,905,102 | Johnson | Apr. 25, 1933 |
| 2,164,811 | Floss | July 4, 1939 |
| 2,167,758 | Johnson | Aug. 1, 1939 |
| 2,251,607 | Astrowski | Aug. 5, 1941 |
| 2,667,016 | Seborg | Jan. 26, 1954 |
| 2,763,106 | Evashevski | Sept. 18, 1956 |
| 2,771,714 | Schmidt | Nov. 27, 1956 |
| 2,821,049 | Harris | Jan. 28, 1958 |
| 2,829,470 | Johnson | Apr. 8, 1958 |
| 2,877,606 | Ljunggren | Mar. 17, 1959 |